Nov. 24, 1959   J. G. BLACK, JR., ET AL   2,914,161
ORIENTING FEEDER
Filed Oct. 31, 1955   9 Sheets-Sheet 1
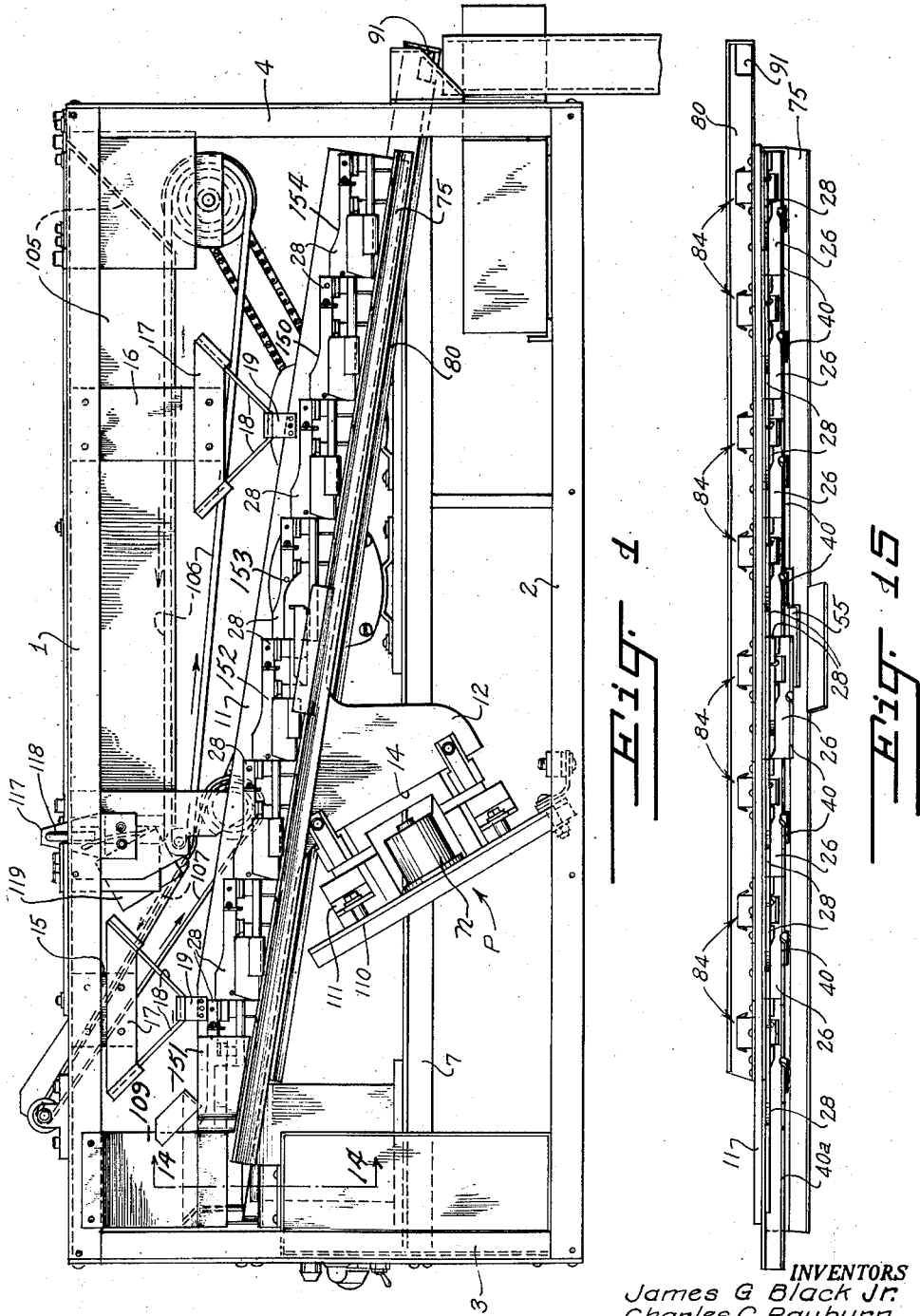
INVENTORS
James G. Black Jr.
Charles C. Rayburn
BY
Donald P. Smith
Attorney

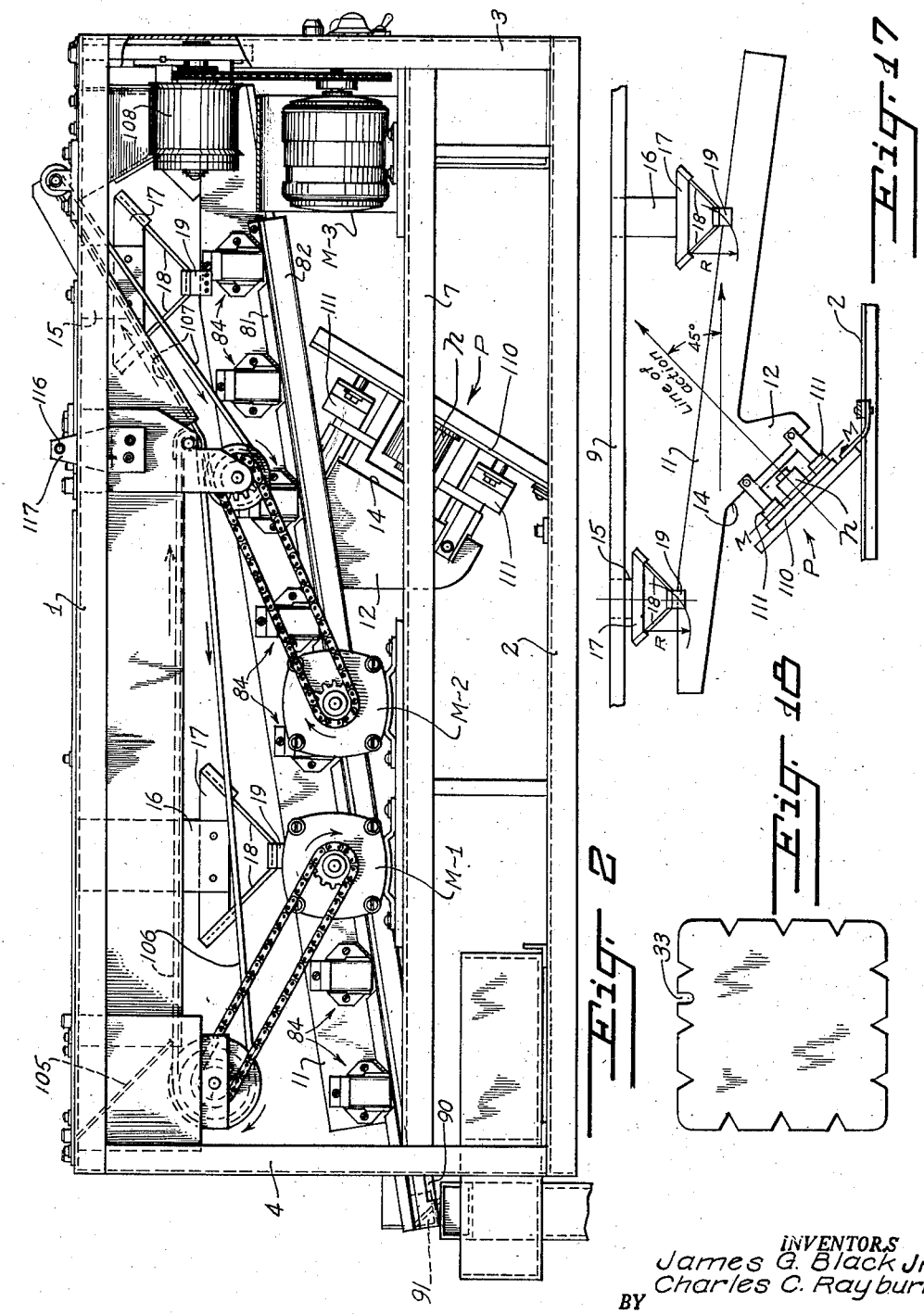

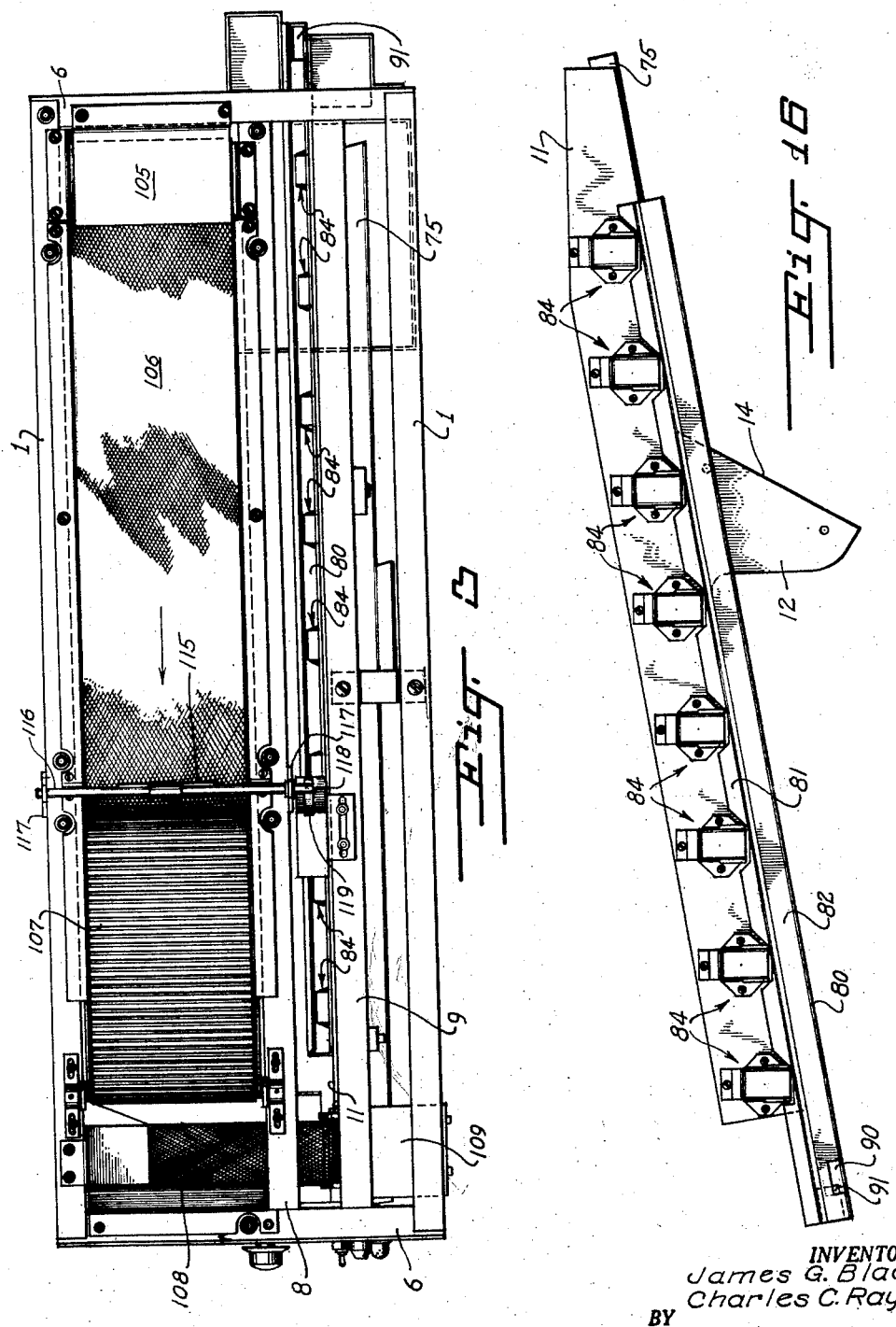

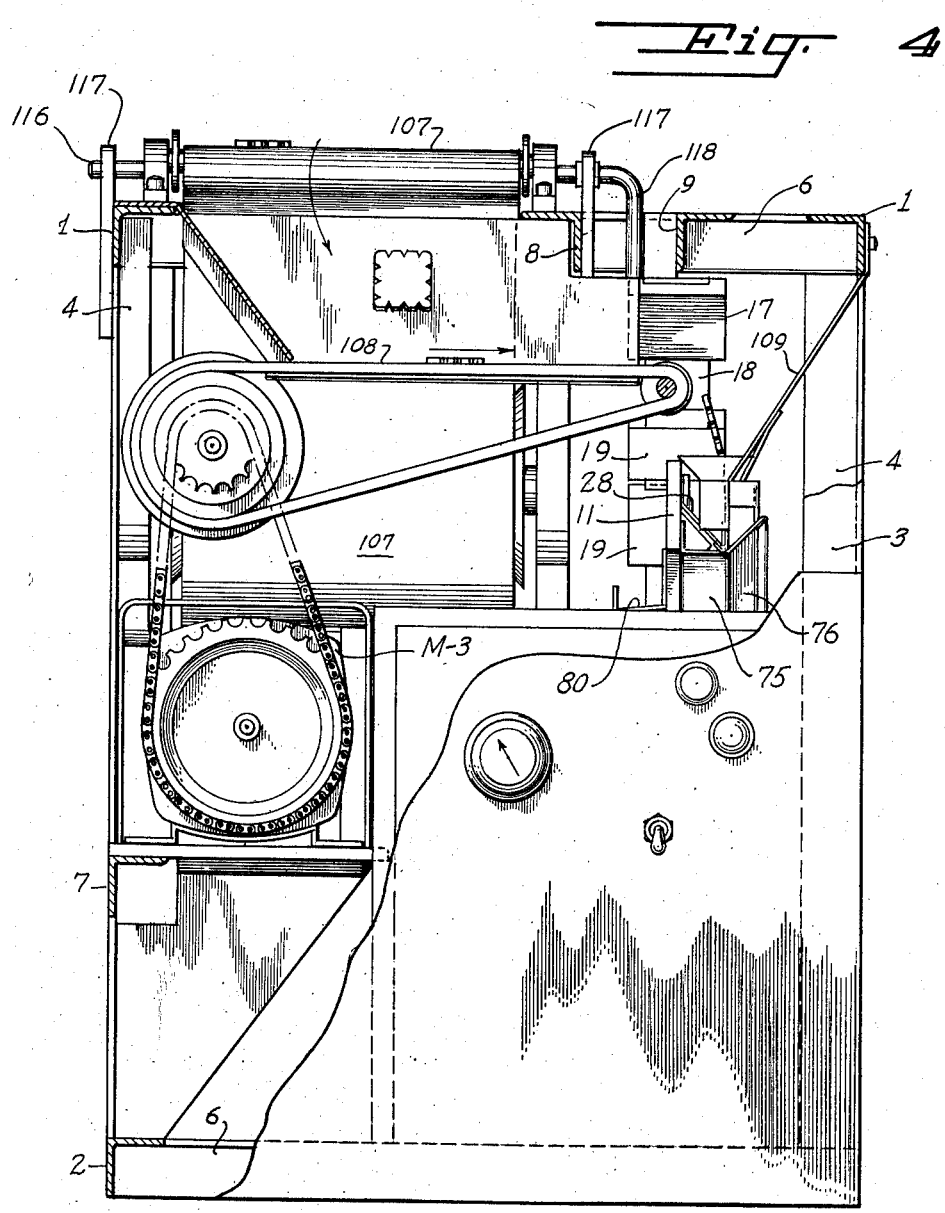

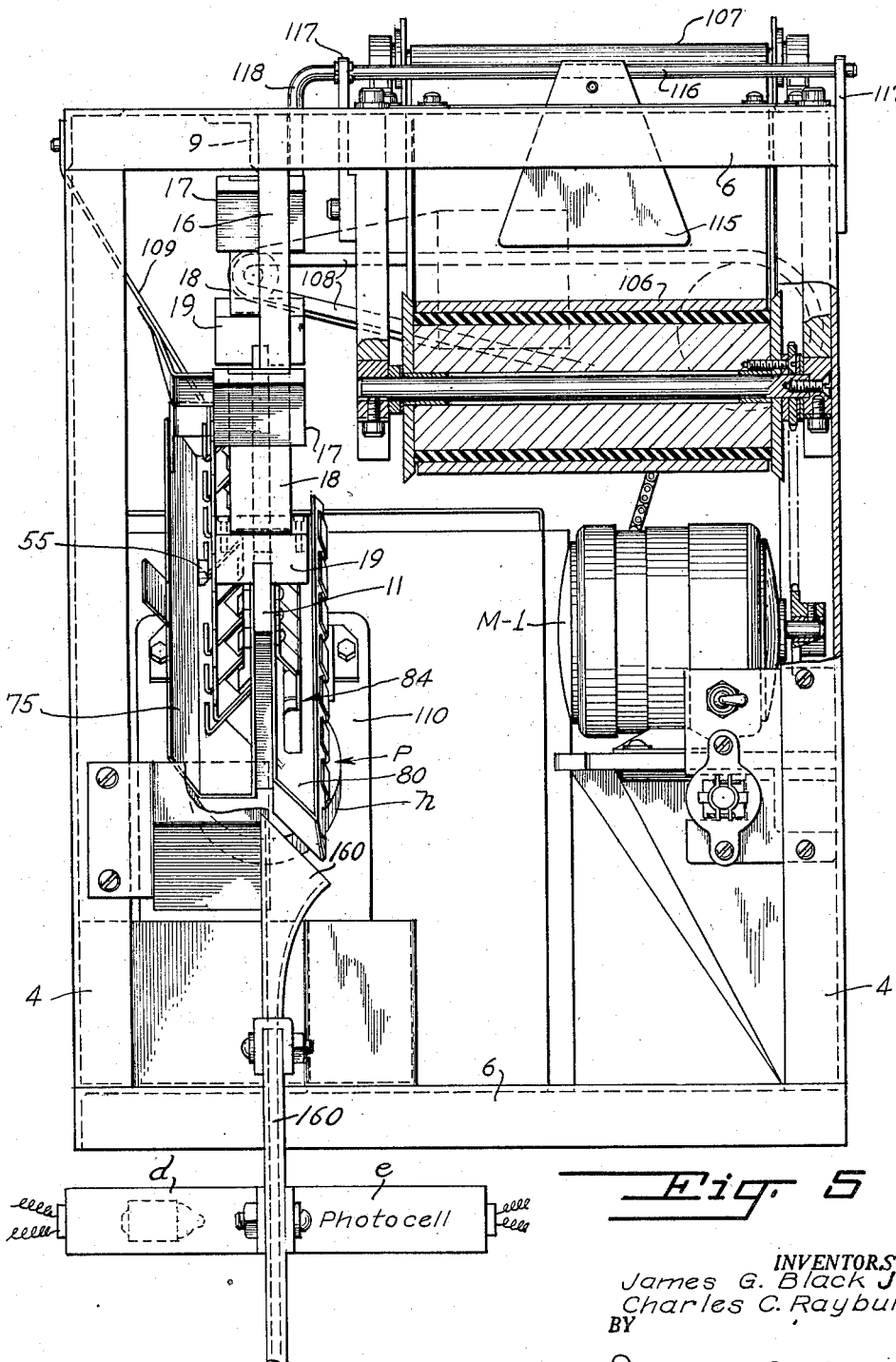

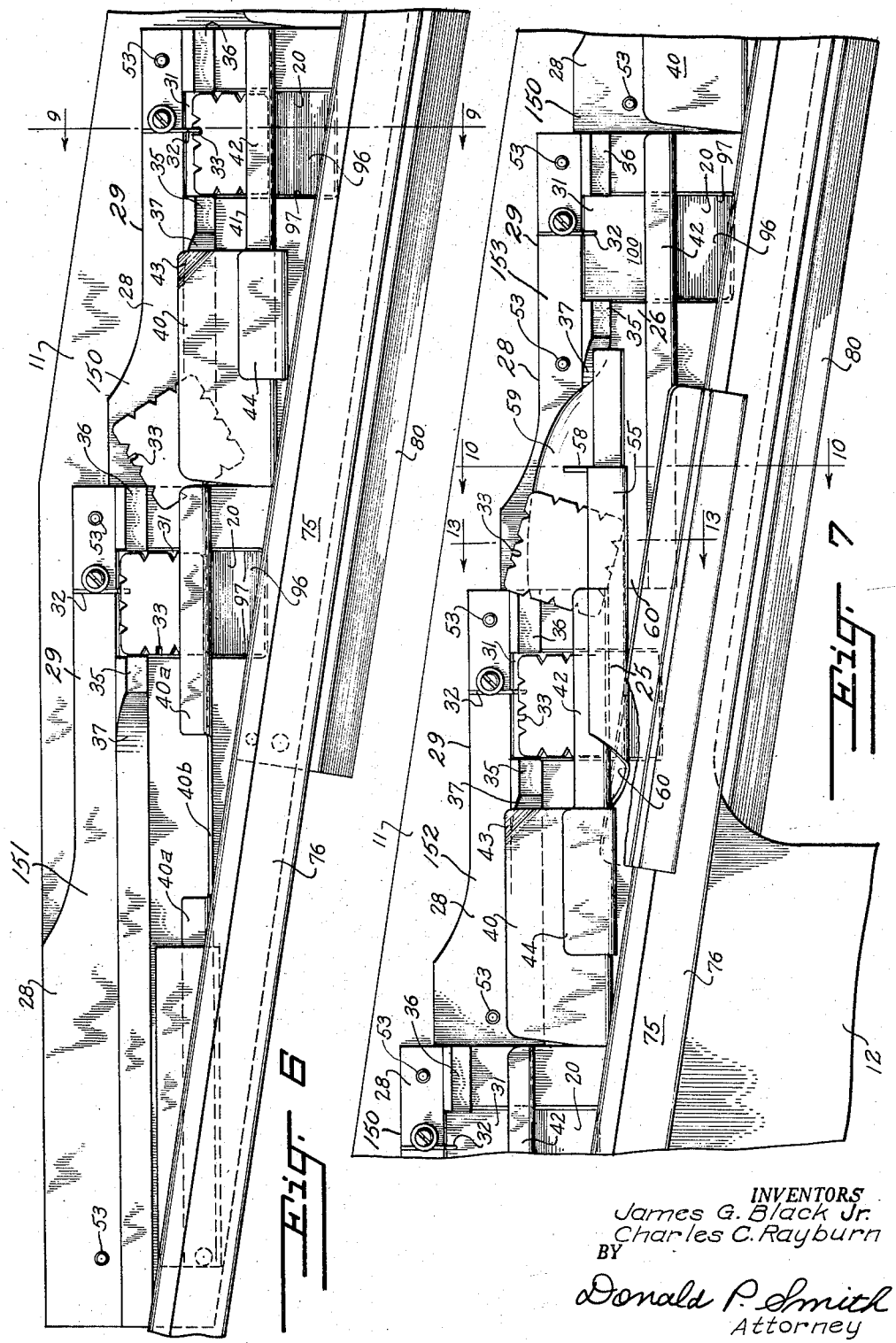

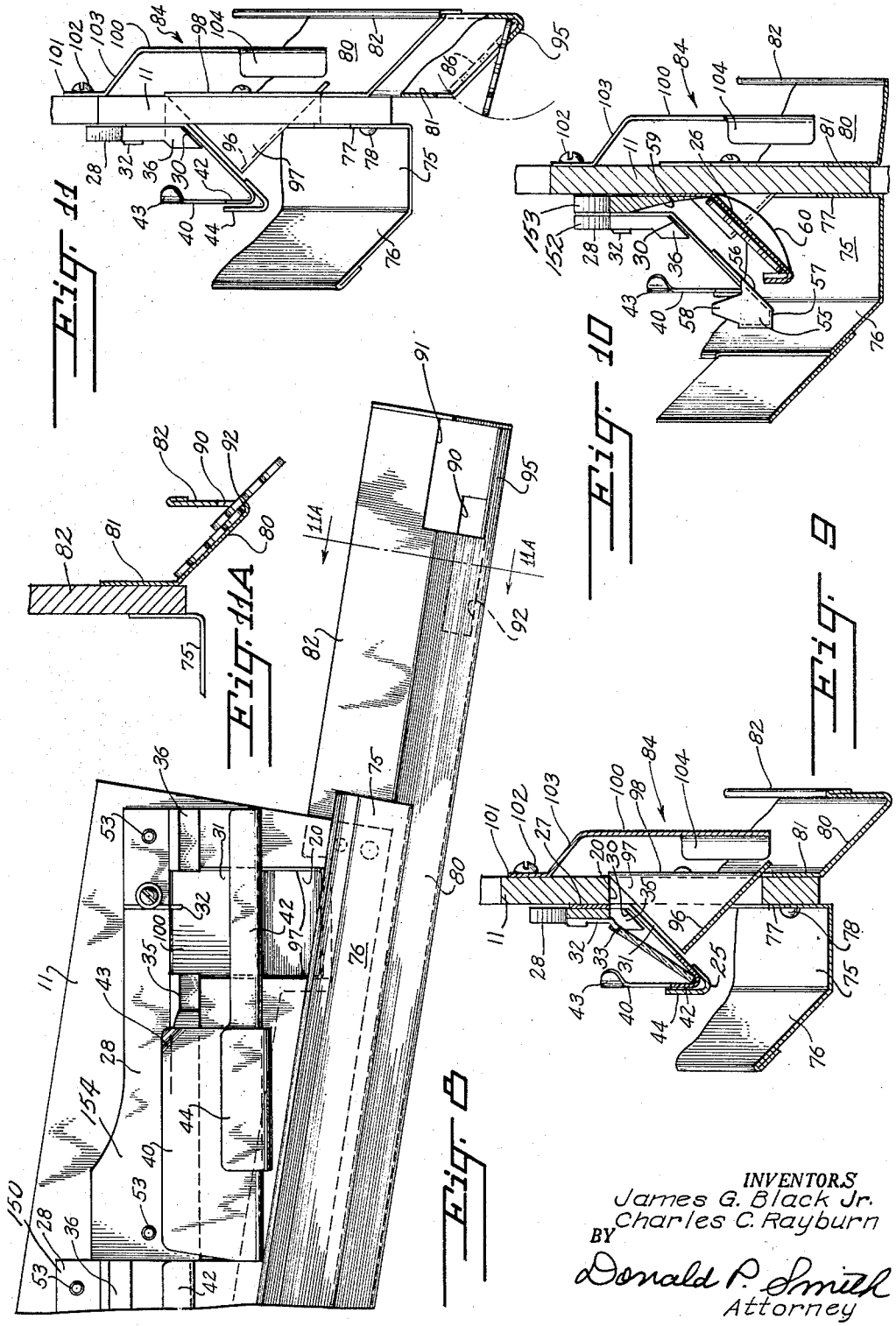

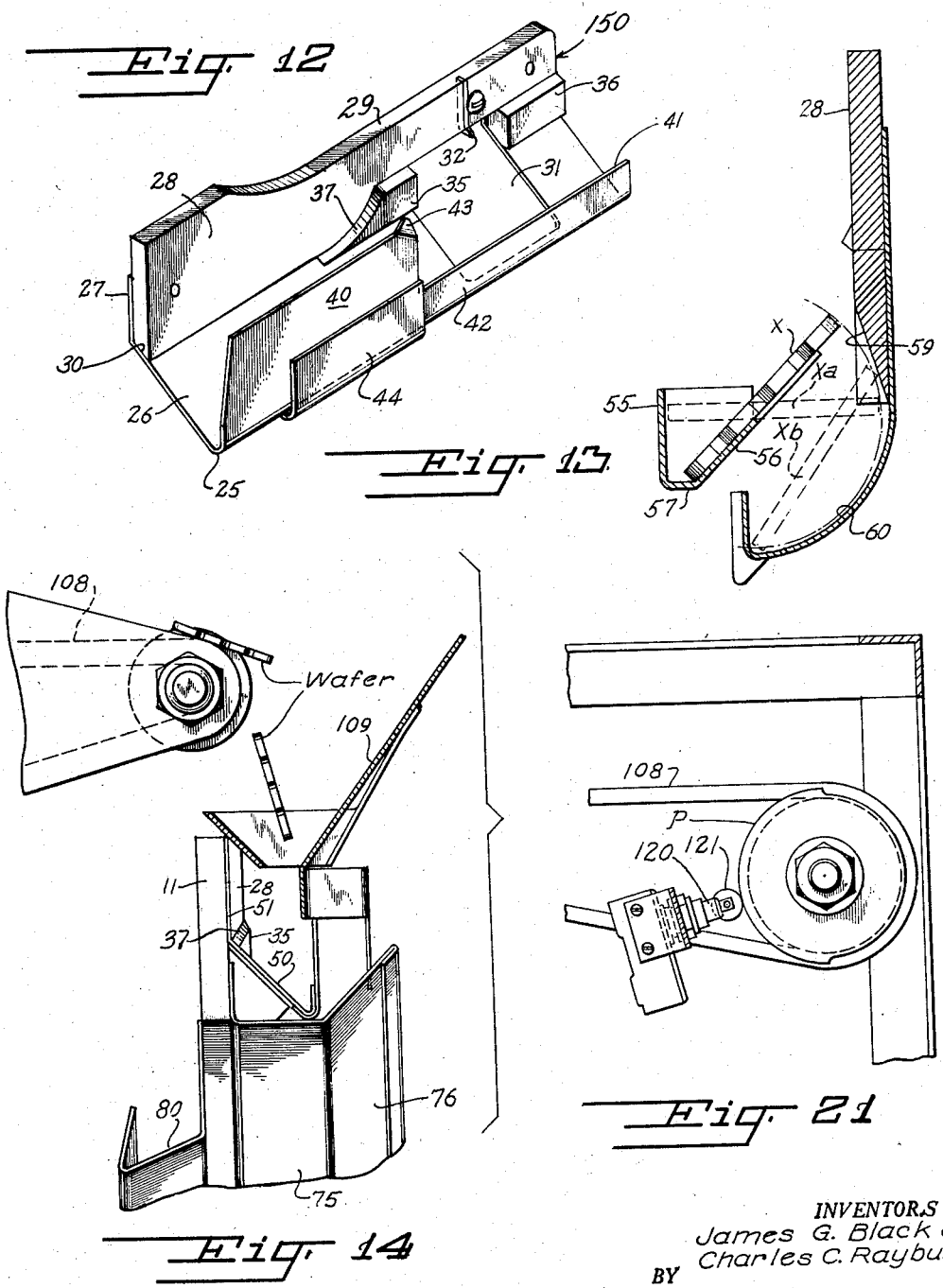

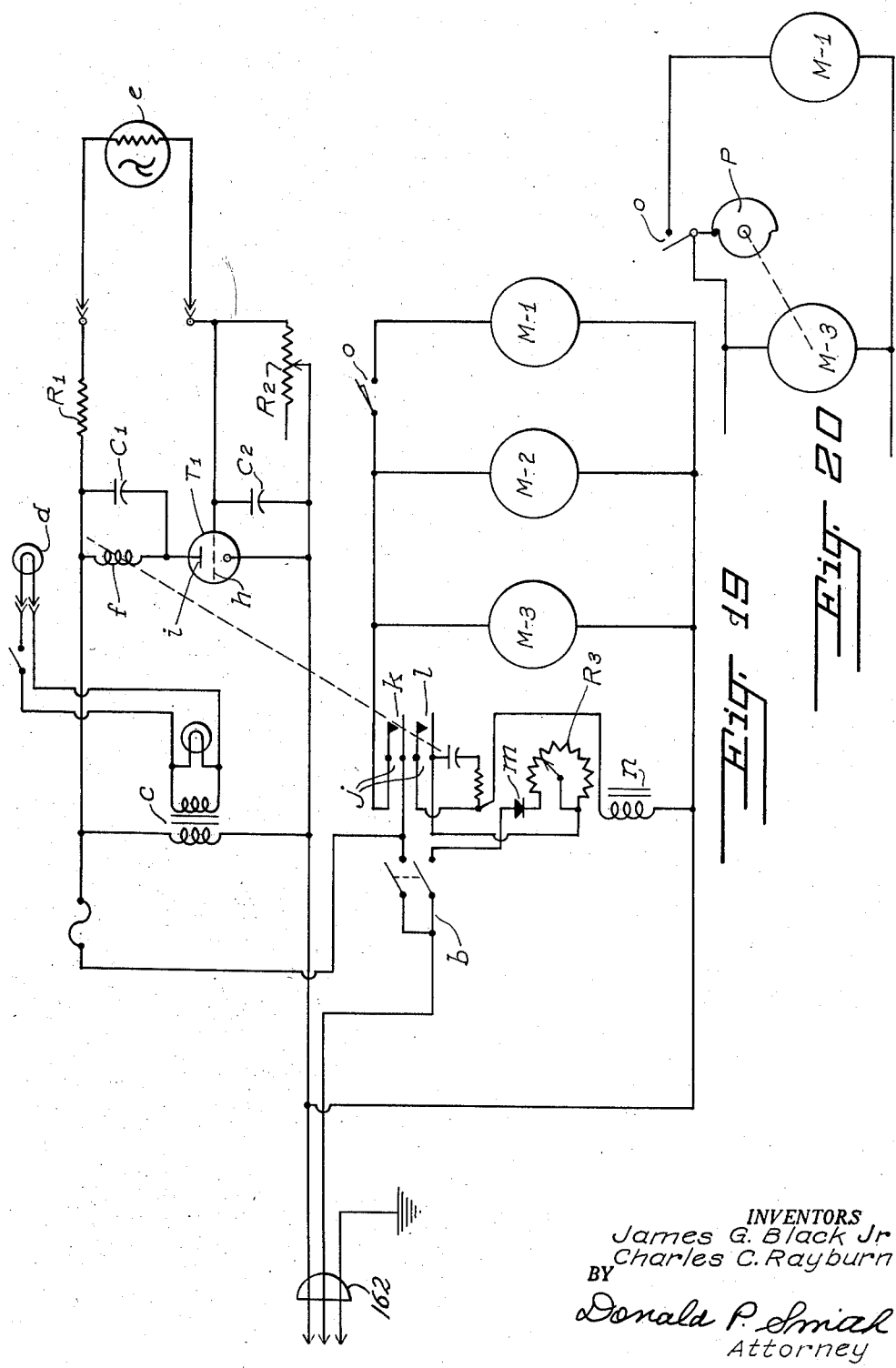

United States Patent Office 2,914,161
Patented Nov. 24, 1959

2,914,161

ORIENTING FEEDER

James G. Black, Jr., and Charles C. Rayburn, Falls Church, Va., assignors to ACF Industries, Incorporated, New York, N.Y., a corporation of New Jersey Application October 31, 1955, Serial No. 543,818

17 Claims. (Cl. 198—33)

This invention relates to improvements in an orienting feeder apparatus, particularly designed for use in connection with components of module assemblies. The instant application is an improvement on our prior application Serial No. 363,952, filed June 24, 1953.

In the electrical art, and particularly in electronic apparatus, module assemblies are provided and may include ceramic wafer elements, these wafer elements being generally square and flat and uniform in dimension and thickness. The marginal edges of the wafers are provided with V-notches, generally equally spaced, and one U-shaped orientation notch, recess, or keyway, located symmetrically and centrally between two of the V-notches. By providing these ceramic wafers with the orientation notch on one edge and located in the manner described, there is provided means which permit singling out any final position of the wafers by providing all of the wafers with their orientation notches in registry. The orientation of the wafers is necessitated by the fact that they will embody certain printed circuitry, this circuitry being usually on both sides of the wafer with lead connections terminating at the notches, the latter forming junction points for connecting circuits.

The main object of the present apparatus is to feed plain or processed wafers from a random pile to an orienting mechanism, the latter operating automatically and continuously to bring all of the wafers to a position such that when superimposed, the orienting notches will register.

Another object of the invention is to construct an apparatus which will automatically orient ceramic wafers by the use of a vibrating feed mechanism, the feed mechanism embodying means for turning the wafers to each and all possible positions.

Another object of the invention is to provide means for automatically controlling the apparatus to prevent stacking of the wafers in the orienting mechanism.

A further object of the present development is the provision of an orienting apparatus which not only is automatic in operation but is relatively small and compact so that it may be readily used as an attachment to form a part of any machine utilized in the forming and assembly of module assemblies.

Broadly the present illustration of this invention comprehends a vibrating mechanism including eight horizontal orienting tracks arranged in descending stepped relation and providing station-to-station apparatus for the progressive orientation of the wafers which during the operation of the apparatus have a turning movement of 90° when moving from one track to another, there being a reversing mechanism at the end of the fourth track which provides means for confronting the various dimensions of the wafer to the orienting structure built into each of the tracks.

More specifically, the object of the invention is to provide a continuous feeding mechanism in which 90° rotational movement of the surface is provided between each unit to accommodate the four possible faces provided by the first position of the wafer and then reverse the wafer to present the four additional positions, the 90° rotation of the wafer to its eight possible positions and the lateral rotation of the wafer to reverse its position at the end of the first four marginal 90° rotations all being accomplished by a single power source and unitary structure.

Another object of the invention is the provision of the novel form of reversing structure interposed in the assembly after the fourth unit.

Another object of the invention is to provide automatic means for regulating the feeding mechanism and for controlling the feeding mechanism, whereby jamming of the feeding mechanism is avoided due to failure of one of the parts to properly function.

These and other objects of the invention will more clearly hereinafter appear by reference to the accompanying drawings forming a part of the instant application, wherein like characters of reference designate corresponding parts throughout the several views, in which:

Figure 1 is a front elevation of the machine;
Figure 2 is a rear elevation of the machine;
Figure 3 is a top plan view of the machine;
Figure 4 is an end elevation partly in section of the feed end of the apparatus;
Figure 5 is an end elevation partly in section of the discharge end of the apparatus;
Figure 6 is an enlarged fragmentary elevation showing the inlet end of the orienting chute;
Figure 7 is an enlarged fragmentary elevation showing the reversing mechanism;
Figure 8 is an enlarged elevation showing the discharge end of the orienting chute;
Figure 9 is a transverse section on line 9—9 of Figure 6;
Figure 10 is a section on line 10—10 of Figure 7;
Figure 11 is an end elevation of Figure 8;
Figure 11a is a transverse section on line 11a—11a of Figure 8;
Figure 12 is a perspective view of one of the orienting chutes;
Figure 13 is a transverse section on line 13—13 of Figure 7;
Figure 14 is an enlarged transverse section on line 14—14 of Figure 1;
Figure 15 is a top plan view of the orienting chute assembly;
Figure 16 is a rear elevation of the orienting chute assembly;
Figure 17 is a diagrammatic view in front elevation showing the supporting structure for the orienting chute and the power source;
Figure 18 is a top plan view of one of the ceramic wafers;
Figure 19 is a wiring diagram showing the distribution of power to the apparatus;
Figure 20 is a modified form of control switch;
Figure 21 is a detail of the control switch used in the circuit shown in Figure 20.

The present apparatus may be mounted on any suitable supporting frame, the instant disclosure embodying a skeleton framework formed of suitable angle iron structural elements. Generally the supporting structure embodies two rectangular frames, each including upper and lower angle irons 1 and 2 and end connecting angles 3 and 4. Cross connections are provided for these spaced rectangular frames, as best shown in Figure 5, these cross connections likewise being formed of angle irons as indicated at 6 and connecting the upper and lower frames at their corners. It will be noted that additional frame elements of similar construction connect the parts together to provide supporting elements, as for instance, the longitudinally extending angle 7 connecting the uprights 3 and 4 of the front frame. Similar braces and supports are provided at the top of the frame structure as at 8 and 9. In assembling the supporting frame it will be noted that the structural elements are arranged to provide a finished appearance, i.e. the angle irons face inwardly, while the braces have their flanges arranged to provide maximum supporting areas.

The basic part of the present development is the orienting mechanism to be hereinafter described in detail, but generally including a vibrating frame member to which the orienting troughs and the reversing mechanism are attached. The vibrating frame member is in the form of an elongated body 11 of relatively heavy plate which is resiliently suspended in a vertical plane with its length inclined downwardly from the horizontal. A fin element 12 (Figures 1 and 16) extends from the lower margin of the plate and has one edge 14 inclined at an angle of approximately 45° from the horizontal. This edge 14 is provided for connection with a motor element P (Figure 17) hereinafter more fully described, it being sufficient here to merely mention that the angle of edge 14 of the fin 12 is generally critical because of its relationship with the motor P from which it receives its vibratory or pulsating motion essential to the movement of the ceramic wafers being oriented.

The plate-like frame 11 is suspended from the top longitudinal brace 9 by means including depending inverted T-shaped brackets 15 and 16, the cross heads 17 of the brackets forming at their extremities clamping areas for the resilient hangers 18, the latter being of any suitable material providing the required free suspension of the frame element 11. Brackets 19 are riveted or welded at suitably spaced points to the plate-like frame element 11 and are shaped to permit the resilient hangers to pass thereunder. It will be noted that the supporting means for the plate element 11 is such that its normal movement is in the direction of its length and the plane of the direction of movement of the motor P.

In the present disclosure, arrangement is provided for orienting a flat square ceramic wafer, and thus eight orienting devices are provided with a reversing mechanism at the end of the fourth structure. In accordance with this disclosure the plate-like frame element 11 is formed with eight spaced openings 20 (Figure 9) arranged in downwardly stepped relation for association with the eight orienting devices 150 which are in the general form of V-shaped troughs 25, as best seen in Figure 12. These openings 20 are formed in the plate frame element 11 to permit the discharge of the wafers from the respective orienting troughs 150, which are mounted on one side of the plate to the other side where means are provided for accumulating the oriented wafers.

One orienting trough structure 150 is shown in Figures 9–12 as being formed from V-shaped sheet metal, the base 25 of the trough forming the path of travel for one of the marginal edges of the square ceramic wafer. The inner side wall 26 of the trough lies in a plane of substantially 45° to the vertical and is flanged at its upper marginal edge at 27 to provide a vertical portion for abutting the adjacent face of the plate frame member 11 during assembly. A relatively heavy wear member 28 is fixed to the inner face of the flange 27 and extends throughout the entire inner face, projecting substantially above the flange 27 as shown. The top portion of the wear member 28 is reduced in height, to approximately the height of the flange 27, for a portion 29 of its length while its bottom edge 30 is beveled to lie flush with the adjacent surface area of the inclined wall 26 of the chute. The inclined wall 26 of the chute and a portion of the wear plate 28 are cut away as at 31 to form square passages for the lateral discharge of the ceramic wafers when the latter are properly oriented. An orienting pin 32 extends from the top wall of the wear member 28 into the discharge opening 31, to register with the orienting recess 33 in the ceramic wafer shown in Figure 18. At each side of the port opening 31, the wear member 28 is formed with longitudinally extending raised guideways or trackways 35 and 36, the first trackway 35 being gradually tapered to merge with the adjacent wall of the wear member 28, as shown at 37, this being at the inlet end and permitting the wafers to freely approach their elevated position on the trackways 35 and 36. It will be noted that the orienting pin 32 has its free extremity terminating substantially flush with the top surface of the trackways 35 and 36 so that the top edge of a wafer in its travel across the port opening 31 is supported in its travel at least one of the two spaced structures 35 and 32 before reaching the second track section 36. The inner wall 40 of the trough structure extends vertically, and is cut away at 41 for approximately one-half of its length and in front of the port opening 31, leaving a reduced wall portion 42 just sufficient to control and guide the ceramic wafers traveling therealong. The upper inner corner 43 of the wall 40 is bent inwardly towards the tapered area 37 of the trackway 35 to control the wafer movement during its lift, and it being remembered that the mechanism is vibrating and the change in travel of the wafer might under certain circumstances require minor control at this point. In the present disclosure reinforcing plates are shown at 44 to give strength to the body structure. The relatively high wall section 40 is provided at the receiving end of each intermediate trough to tend to deflect any wafers which may be inclined to vibrate outwardly during their rotational movement from one trough to another. By having the wall 40 relatively high any wafer which has an exceptional movement would strike the wall 40 and be deflected back against the surface 26 of the inclined wall for movement therealong.

Basically, all of the orienting trough structures 150 are similar insofar as function is concerned, however, the entrance orienting trough 151, the fourth orienting trough 152, and the eighth or final orienting trough 154 are modified, first for initially receiving the ceramic wafers, then reversing these wafers after testing of the first four possible positions, and finally discharging.

The first orienting trough 151 which has provision for receiving the initial supply of wafers from the feed mechanism is shown in Figure 6. This first trough is elongated but of the same V-form as the intermediate structures being modified in that its front wall 40ᵃ is relatively short in height throughout its entire length, except for the area 40ᵇ where the wall is substantially eliminated leaving only a relatively narrow trackway for the movement of only a single wafer. Should more than a single wafer be stacked in this first orienting trough due to an excessive supply from the feeding mechanism, such excessive wafers will discharge through the passageway formed at the cut away wall portion 40ᵇ into the discharge trough below. The outer or free end of the first orienting trough is supported by the channeled bracket 50 fixed at 51 to the plate frame member 11 (Figure 14). Also this first orienting trough is fixed to this frame member 11 by suitable fastenings 53 which extend through the reinforcing plate or wear member 28. This same fastening is used to secure each orienting trough to the frame member 11 throughout the entire structure, it being obvious that the assembly must be inherently rigid throughout.

In Figures 7 and 13 the reversing means for the wafer is illustrated as being an associated part of the fourth chute 152, with the fifth chute 153 modified to provide clearance for the turning wafer. The turning means for the wafer is shown as a V-shaped trough 55 having at least its inner wall 56 of substantially less height than one-half the dimension of the wafer and substantially inclined from the horizontal to approximately 45°. The base 57 of the reversing trough 55 is included in the vertical dimension of the inclined wall 56 so that regardless of the position of the wafer therein, more than one-half projects above the inclined wall structure to insure the turning or falling of the wafer on its flat dimension with the top of the wall 56 as the pivot point for the movement. The movement of the wafer in reversing its position is shown in Figure 13 with the wafer at X in its initial position in the turning trough, at $X^a$ in its half turned position and $X^b$ in its reversed position in the next adjacent orienting trough. It will be noted that the reversing trough is positioned a short distance from the fourth orienting trough 152 to which it is attached to provide continuous life and vibration during the movement of the wafer and that the limit of movement of the wafer is determined by the end stop 58 closing the end of the reversing structure, as indicated in Figure 7. The reversing trough 152 has its base exactly in line with the base or track of the fourth orienting trough 152 and the spacing of the reversing trough therebelow is small to prevent any turning of the wafer to another marginal edge portion. Also the stop 58 at the end of the trough is so spaced as to prevent a piling of the wafers, this structure accommodating a single wafer at a time. In order that the wafer may turn on its flat side to a reverse position, the fifth orienting trough 153 has its backing or wear plate 28 cut away at 59 and the inner inclined wall 26 of trough 153 is curved in an arc at 60 as best shown in Figure 13. It will be noted in this figure that the turning wafer in its $X^b$ position is swinging clear of the wall of the wear plate 28 and then turns freely on the arcuate surface of wall portion 60 formed from the adjacent end of wall 26 of chute 153. The fifth orienting chute 153 (Figure 7) has its arcuate guide face 59 and wall portion 60 merging into the guide face 37 and permits travel of the wafer thereover onto the guide 35 which positions the same for the orienting port opening 31 of the trough 153.

The eighth or discharge orienting chute 154 is illustrated in detail in Figures 8 and 11. In this view it will be seen that the guard plate 75 which extends throughout the assembly terminates at the end of the eighth orienting chute and has its upwardly and outwardly inclined wall 76 well to one side of the orienting mechanism. The inner vertical wall 77 of the guard is secured by any suitable means to the plate frame 11 as by rivets 78. The eighth orienting chute 154 is open and terminates just short of the end of the guard 75, as all wafers at this point have been oriented and discharged through the orienting openings at the eight stations provided.

On the inner face of the orienting frame 11 is a guide channel for receiving and discharging the oriented wafers from the eight orienting chutes. This guide channel is best shown in Figures 9 and 11 and includes the downwardly inclined base 80 and inner and outer vertical walls 81 and 82, respectively. The inner wall 81 is secured to the plate frame 11 and is notched about each of the openings in the frame member to provide for the passage of the wafers from the orienting mechanism and the arrangement of the discharge spout 84 (Figure 16) from the several orienting chutes and through the plate frame 11. The base 80 of the discharge channel lies at an angle of approximately 45° and the wafer in its discharge movement lies against this angular base throughout its travel as shown at 86 in Figure 11. The channel discharge structure extends substantially beyond the balance of the assembly, as shown in Figure 8, to provide access to points of discharge or equipment which is to operate or assemble the oriented wafers. There are two discharge openings in the discharge channel, the first opening being indicated at 90 and being formed as shown in Figure 8 immediately before the opening 91 in the inclined base 80. The opening 90 is for the discharge into a suitable receptacle of excess or stacked wafers which might accumulate during operation of the machine, it being noted that the lower wall 92 defining the base of the opening 90 sets above the plane of the inclined base a distance approximating the thickness of a wafer. By this arrangement a second or a third wafer stacked on the first wafer in actual contact with the base 80 would be discharged through the opening 90 and returned to the machine for reorienting (Figure 11a). The discharge opening 91, through which the oriented wafers are to be discharged into a machine or other use, is cut to receive the profile of the wafer and as best shown in Figure 11 the opening provided for this purpose extends close to the bottom of the inclined wall 80 up into, and partially through, the vertical wall 81 as best shown in Figure 11. The shelf 95 at the base of the opening and formed by a portion of the inclined wall 80 is intended to be sufficient to lend support to the wafer until it reaches a position fully within the opening, whereupon the wafer turns on the upper edge of the flange or shelf 95 in an arc and down into a suitable chute mechanism which may lead to any machine for further operation upon the wafer.

Guideways are provided for directing the oriented wafers from each orienting chute throughout plate 11 and into the discharge hopper for discharge through the ports 91 or 92. These guideways are each identical and include inclined bases 96, side walls 97 and side flanges 98 (Figure 9), the latter being secured to the inner face of the plate 11 to hold the guideways in position. It will be noted that the inclined guideways 96 extend immediately below each of the orienting openings to a point within the discharge channel. Guard plates 100 are positioned opposite these guideways, these guard plates including securing flanges 101, fastened by screws 102 to the inner face of the channel plates 11 and the body of the guards are offset by the inclined portions 103 of the structure. Side flanges 104 extend inwardly to form a housing through which the oriented wafer travels into the channel structure.

It is a function of this machine to provide and maintain against a variable demand a ready supply of stacked, identically oriented, rectangular wafers from a source of randomly distributed wafers piled in a bin. The essential components of the apparatus include a supply bin containing randomly oriented specimens, an orienting device for selectively rotating all wafers to a predetermined orientation, and a set of three conveyor belts for transferring a continuous supply of wafers from the supply bin to the orienting device. In operation, randomly oriented wafers are deposited from the bin 105 (Figures 2, 3, 5, 17) onto a first feed belt 106, falling at the end onto an inclined belt 107 of slotted form for spreading the wafers, which elevates them to the top of the machine. A third transversely arranged conveyor belt 108 receives the wafers falling from the inclined belt and transfers them transversely across the machine to a supply chute 109 (Figure 14) for the orienting device (Figure 5).

To summarize, the orienting device is provided with eight stations at which a wafer is tested for a desired orientation. Eight test stations are required for a four-sided wafer having an index notch off the center of one side, as the possible combinations of four edges taken on two sides is eight. The wafers are removed from the entry chute onto a downwardly inclined vibrating track. At each of four stations along the track the wafer is matched against an aperture of a size just sufficient to accept the profile of the wafer if the orientation is such that the index notch in the wafer coincides with a positive finger projecting from the aperture. If the wafer fails to fall through, it is improperly oriented and continues to vibrate toward the next test station. During the transfer, the wafers are caused to rotate through 90° on an axis perpendicular to its flat face. At the next station the wafer is again tested for the desired orientation. After four test stations and three 90° rotations, the wafer is turned over on its face and thereafter proceeds through the four remaining test sites. Upon reaching a test site at which it has received the proper orientation, the wafer falls into a collecting chute 80 which transfers it, while maintaining the proper orientation, to a collecting chute 160 where all the wafers are stacked edge to edge.

As the present machine can be used as a source of supply for a utilization device requiring a slower rate of supply than the maximum output available, a device for regulating the output is provided. Regulation is accomplished by means of a photocell detector $e$ arranged to sense the accumulation of a predetermined supply of wafers in the storage chute 160 and a solenoid switch arranged to turn off the three belt-driving motors and the vibrator motor until the supply falls below such a predetermined level.

The circuit by which the accumulation of oriented wafers is controlled is shown in Figure 19. Alternating current power is supplied to the photocell sensing and control circuit as well as to the motor system through input plug 162 and manually controlled switch $b$ inserted in one side of the line which turns on the machine. In the sensing circuit, an incandescent lamp $d$, providing a source of radiant energy, is powered by the output of a transformer $c$ with primary connected across the A.C. supply voltage. Light from the lamp $d$ is projected onto photocell $e$ except when it is blocked by accumulation of wafers in excess of a predetermined number in the storage chute 160. Photocell $e$ is of the photoconductive type for which the resistance decreases as the incident light increases, rather than a current generator type. The photocell $e$ is connected across the A.C. power supply in series with two resistors starting at the switch side of the line through resistor $R_1$, through photocell $e$, through rheostat $R_2$ to the other side of the line. A cold cathode triode (a gas filled tube) $T_1$ is also connected across the line with solenoid coil $f$ interposed between the anode $i$ of $T_1$, and the switch side of the power supply. A capacitor $C_1$ is connected in parallel with solenoid coil $f$. The grid $h$ of the triode $T_1$ is directly coupled to a point between photocell $e$ and rheostat $R_2$. In operation the voltage on the grid $h$ of tube $T_1$ is adjusted with rheostat $R_2$ until conduction is cut off while the light from lamp $d$ is prevented from reaching photocell $e$. When the light is applied to photocell $e$, the resistance between anode and grid decreases with respect to that between grid and cathode, resulting in an increasing positive grid potential with respect to cathode during each positive half cycle of A.C., when the tube can conduct, causing conduction of the tube $T_1$ and energization of solenoid coil $f$. The relative phasing between the A.C. voltage applied to grid $h$ and to the anode $i$ is affected by the relative amount of capacity $C_2$ with respect to resistance $R_2$ and that of capacity $C_1$ with respect to the inductance inherent in solenoid coil $f$. The values of these capacitances are chosen to give an effective cut off grid bias without the use of a separate source of bias potential. Capacitor $C_1$ also, serves to smooth the flow of energizing current through solenoid $f$.

Energization of solenoid $f$ closes a double pole switch $j$ through contacts $k$ and $l$. The closing of contact $k$ applies power from the line through switch $b$ simultaneously to three belt-driving motors M3, M2 and M1. With the other contacts $l$, A.C. power is passed through a half wave rectifier $m$, control rheostat $R_3$ and vibrator motor $n$ all connected in series. In this manner it will be appreciated that the operation of switch $j$ controls not only a vibrator motor but also the belt-driving motors which supply the orienting trough.

A system providing additional control for one of the feed belt motors is shown in Figure 20. It consists of a switch $o$, connected in series with motor M1, actuated by a cam $p$ driven continuously by motor M3. The cyclic operation of switch $o$ causes a corresponding intermittent operation of the first supply belt 106, thus reducing the tendency for accumulation of a surplus number of wafers on the second and third belts in the conveyor train.

If we consider a single wafer placed on the horizontal track, the angle included between this track and the line of action of the vibratory movement Ω is 45°. Assume that the material of the wafer is inelastic whereby no bounce will occur, and the track with wafer will move in perfect contact throughout the total excursion, 2A, upward in the direction of the line of action at Ω=45° as impelled by the stored up energy of the resilient rubber mountings. The next pulse will pull the system back along the same path, but as the wafer is an independent system it will be solely under the influence of gravity and having decelerated to zero velocity together with the track, the wafer will fall in a straight vertical direction. It will make contact again when the track on its downward path has decelerated to zero velocity. In this way the wafer will follow the track smoothly as there are no velocities in an opposite direction, and wafer travel will be maximum, that is, the full horizontal component of the excursion 2A.

The amplitude may be calculated on the basis of the above consideration. Shown below is the excursion of the chute during one full cycle.

Travel during a full cycle is 2A.

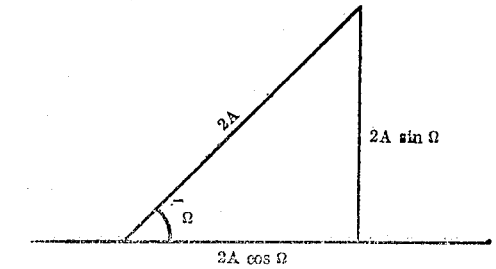

Drop of the wafer is the vertical component, and travel of wafer is the horizontal component.

For the wafer to finish the vertical drop when track has decelerated to zero velocity, the periodic time has to equal the time required for the wafer to fall through the vertical component of the excursion 2A sine Ω, and as the periodic time $$T=\frac{1}{f}; \text{ and from } w=2\pi f$$

① $2A \sin \Omega = \tfrac{1}{2}gt^2$ $$f=\frac{\omega}{2\pi} \therefore T=\frac{2\pi}{\omega}$$

since $T=t$, substitute in ①

② $2A \sin \Omega = \tfrac{1}{2}g\frac{4\pi^2}{\omega^2}$

③ $A=\dfrac{g\pi}{\omega^2 \sin \Omega}=\dfrac{32.2 \times 12 \times \pi^2}{4\pi^2 \times 60 \times 60 \times .707}$ $$=0.02683 \text{ in.}$$

Travel per sec.=$2A$ sine $45° \times 60 = 120 \times .707 \times .02683$ =2.276 in./sec. Testing a single wafer traverse in a feeder chute 9″ long gives average travel time of 4 seconds. Calculated time for wafer traverse 9/2.276 =3.954 sec.

It will be noted that the coefficient of restitution, or bounce of the wafer, has been neglected; a contribution of bounce would decrease the optimum amplitude of table vibration. Slippage between the table and wafer during contact would result in reduced forward net velocity of the wafers.

Control rheostat $R_3$ of Figure 19 also allows the adjustment of motion to rates less than the optimum value if this is desired in the operation of the machine.

Referring to Figures 1 and 17, the motor mounting is illustrated and the connection between this motor and the fin 12, whereby the impulses imparted during a half cycle gives acceleration to the plate 11 in the direction of the line of action of impulse, as shown in Figure 17. Kinetic energy of the motor N, the base plate and balance weight 110 is absorbed by the rubber mountings 111. During half of a cycle rest interval rubber mountings 111 restore their original shape giving up the stored energy and thereby assisting to return the parts to their original position. The balance weight increases the mass energy acting upon the rubber mounting 111 to such an extent as to obtain perfect harmonic motion about line M—M, no motion going in the direction perpendicular to this line of action through the rubber mounting, as shown in Figure 17. The character of this motion can be influenced by the type of suspension and this suspension has been fully set forth and includes the T-supports 15—16 and the suspenders 18, best shown in Figure 1. By this form of suspension, the whole mass is guided along one limb of the rubber suspension resulting in a more controlled movement.

The present apparatus feeds and orients ceramic wafers as described, and the novel form of feed mechanism and the arrangement of parts shown and described insures constant and careful handling of the wafers both prior to their orientation and subsequent to such action. It will be noted that the feed belts are separately driven by independent power sources and that these feed belts provide a constant and uniform supply of ceramic wafers to the orienting mechanism at all times. The feed belt 106 is provided with a spreader plate 115, mounted on the cross hanger 116, the hanger being pivotally mounted in the frames 117 secured to the main framing. The inner end of the cross hanger 116 has a depending arm 118 which actuates a stop switch 119 to shut off the motor should the supply on the belt 106 stack. This cut-off mechanism can be used in lieu of the disclosure of Figure 20 heretofore described, and in which an intermittent feed is provided to regulate the supply of ceramic wafers moving to belt 107. The photocell e can be arranged at any point in the discharge, which usually is in the form of the chute 160 which delivers the oriented wafers to the machine operating upon the wafers. Normally, the photocell e will be associated with this chute to prevent a stacking of the wafers which will be fed edgewise in the chute. Obviously this control will stop the movement of all parts of the mechanism and the orienting and feeding of the wafers. The cutout for No. 1 motor controlling the main feed belt from the supply hopper is illustrated in detail in Figure 21, wherein the switch 120 is shown as of the oscillating type and is operated by the cam p. The end of the switch actuated plunger 120 is provided with a roller 121 to eliminate friction between the parts. This switch mechanism may be of conventional form.

Since the above-described organization is of general utility and is to be used as a secondary machine to feed oriented wafers into fabricating machines which act to physically support the same, it is important that none of the vibration be imparted to the machine so fed. The flexible suspension between the frame and the plate 11 described, supra, acts to isolate the vibratory motion to the exact portions needed for the feeding cycle and no vibration can therefore be transmitted through the frame to the supporting fabricating machine.

What we claim is:

1. In an orienting apparatus for flat articles having an identifying recess, a supporting frame, an orienting feeder for said articles, including a plurality of vibrating downwardly inclined troughs arranged in descending stepped rectilinear relation, each of said troughs including guideways along which the articles travel downwardly during vibration of the troughs, each of said guideways being defined in part by inclined walls, said walls being formed with windows of a dimension permitting the article to fall laterally therethrough, a stop element positioned within the window opening for passage through the recess in the article when the article is so oriented, means suspending said feeder, and vibrating means having impulse movement in a direction intersecting the angle of inclination of the feeder.

2. An orienting trough for use in an apparatus for orienting ceramic wafers, said trough being of general V-form with one wall extending generally vertically and the other wall extending at an acute angle for the flow of wafers thereagainst, the wall lying at an acute angle being formed with a discharge port opening of substantially the same size as the wafers to be oriented, an orienting projection extending within the port opening, and trackways extending longitudinally at each side of the opening above the wall, said trackways presenting spaced raised surfaces adjacent each opening for lifting the wafer for its association with the orienting projection.

3. The structure of claim 2 characterized in that the generally vertical wall of the trough includes an inward projection for engaging the wafer when the latter initially moves onto the trackway for maintaining the wafer in contact with the wall of the trackway.

4. The structure of claim 2 characterized in that the generally vertical wall of the trough is cut away in the area opposite the port opening.

5. In an apparatus for orienting flat ceramic wafers of square form with an orienting recess formed in one marginal edge thereof, said apparatus including a supporting structure, a vibrating frame having discharge ports therethrough, resilient diverging suspenders supporting said frame at each end, longitudinally arranged resilient means between said frame and supporting structure, a plurality of troughs supported at one side of the frame and arranged in descending stepped relation in the direction of travel of the wafers, said troughs each including a bottom guideway along which a marginal edge portion of a wafer travels during vibration of its supporting frame, and a side wall against which the side of the wafer lies during its travel, the side wall being formed with a port opening therein for the discharge of the wafer, and a pin extending into the port opening for supporting the wafer during its travel across the port opening, said pin projecting from the upper wall of the port opening and being of a size to pass freely through the orienting recess formed in one wall of the wafer when the wall containing the recess is at the top of the wafer, said troughs being stepped downwardly a sufficient distance to permit rotational movement of 90° of the wafers when moving from trough to trough, whereby a separate edge of the wafer is presented at each trough for association with the pin in the port opening of that trough, a reversing mechanism positioned at the discharge end of the fourth trough, said reversing mechanism operating to present the four additional marginal edge positions to four similarly constructed additional troughs, a discharge trough extending the full length of the opposite side of the vibrating frame for receiving the wafers from the respective troughs in their properly oriented position through the discharge ports of the supporting structure and for moving said wafers in their oriented position to a discharge position, said discharge trough being connected to said vibrating frame to cause the feeding of the oriented wafers to the discharge end, and feed mechanism for feeding wafers to the first trough.

6. The structure of claim 5 characterized in that the vibrating frame is arranged at an angle and the troughs are supported by the vibrating frame and lie substantially horizontal and in vertically spaced relation.

7. The structure of claim 5 characterized in that the side wall of the trough against which the wafer lies during its travel is provided with raised longitudinally extending portions forming guideways which elevate the traveling wafer to a position to be supported by the free end of the pin extending into the port opening.

8. The structure of claim 5 characterized in that the troughs are generally of V-form and one wall of each trough is reinforced to provide a supporting structure for attachment to the vibrating frame.

9. The structure of claim 5 characterized in that the reversing mechanism is in the form of a channel extending from the discharge end of an intermediate trough.

10. The structure of claim 5 characterized in that the reversing mechanism is in the form of a channel having a closed end and projects from an intermediate trough.

11. The structure of claim 5 characterized in that the reversing mechanism is in the form of a channel element projecting from the discharge end of an intermediate trough, and the adjacent wall of the next trough along which the reversing mechanism extends is recessed to permit lateral rotational movement of the wafer.

12. In an orienting apparatus for flat articles having an identifying recess, a supporting frame, an orienting feeder for said articles, including a plurality of vibrating troughs arranged in descending stepped relation, each of said troughs including guideways along which the articles travel during vibration of the troughs, each of said guideways being defined in part by inclined walls, said walls being formed with windows of a dimension permitting the article to fall laterally therethrough, a stop element positioned within the window opening for passage through the recess in the article when the article is so oriented, a vibrating plate suspended from the supporting frame to which said troughs are fixedly secured, and a motor supported by the frame for vibrating said troughs.

13. The structure of claim 12 characterized in that the vibrating plate is mounted for unobstructed vibration and the motor for vibrating said troughs is resiliently mounted for movement in a direction substantially 45° from the plane in which the troughs are positioned.

14. The structure of claim 12 characterized in that the vibrating plate includes a depending fin having an angular face to which the motor is mounted.

15. The structure of claim 12 characterized in that the vibrating plate is suspended at an angle from horizontal and the troughs are fixed to said plate in horizontal descending stepped relation.

16. In an orienting apparatus for flat articles having an identifying recess, a supporting frame, an orienting feeder for said articles including a plate like member having spaced transverse downwardly stepped ports at predetermined stations, a plurality of downwardly inclined troughs fixed along one side of said member, said troughs being arranged in descending stepped relation, each of the troughs including inclined guideways adjacent the side face of said member along which the article travels, said inclined walls including windows of a dimension to permit oriented articles to fall therethrough, said windows being arranged in registry with the windows in the plate like member, a discharge chute fixed to the opposite side of the plate like member, means delivering the oriented articles through said windows and into said delivery chute, means resiliently mounting said assembly on said supporting frame, and means for vibrating said assembly on its resilient supports.

17. The structure of claim 16 characterized in that the delivery chute includes an angularly arranged base along which the flat articles travel, the base having a discharge opening for articles traveling therealong, and a vertical wall, the vertical wall having a discharge opening for stacked articles.

References Cited in the file of this patent

UNITED STATES PATENTS

| | | |
|---|---|---|
| 757,477 | Marcus | Apr. 19, 1904 |
| 2,100,878 | Shallock | Nov. 30, 1937 |
| 2,158,069 | Grover | May 16, 1939 |
| 2,221,396 | Evoy | Nov. 12, 1940 |
| 2,444,134 | Hittson | June 29, 1948 |
| 2,654,466 | Spurlin | Oct. 6, 1953 |
| 2,675,120 | Autenrieth | Apr. 13, 1954 |

FOREIGN PATENTS

| | | |
|---|---|---|
| 52,275 | Sweden | Apr. 19, 1917 |